US010603587B2

(12) United States Patent
Wakeford et al.

(10) Patent No.: US 10,603,587 B2
(45) Date of Patent: *Mar. 31, 2020

(54) SYSTEM AND METHOD FOR FACILITATING COLLABORATION BETWEEN MULTIPLE PLAYERS TO ACHIEVE A GOAL IN A GAME

(71) Applicant: Kabam, Inc., San Francisco, CA (US)

(72) Inventors: Kent Wakeford, Hillsborough, CA (US); Clifford J. Harrington, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/023,776

(22) Filed: Jun. 29, 2018

(65) Prior Publication Data
US 2018/0304152 A1 Oct. 25, 2018

Related U.S. Application Data

(63) Continuation of application No. 14/078,337, filed on Nov. 12, 2013, now Pat. No. 10,086,263.

(51) Int. Cl.
A63F 13/50 (2014.01)
A63F 13/30 (2014.01)
A63F 13/847 (2014.01)

(52) U.S. Cl.
CPC ............ A63F 13/50 (2014.09); A63F 13/12 (2013.01); A63F 13/30 (2014.09); A63F 13/847 (2014.09); A63F 2250/13 (2013.01)

(58) Field of Classification Search
None
See application file for complete search history.

(56) References Cited

U.S. PATENT DOCUMENTS

| 8,262,468 | B1 | 9/2012 | Vanbragt | |
|---|---|---|---|---|
| 8,328,643 | B1 | 12/2012 | Osvald | |
| 2006/0094495 | A1* | 5/2006 | Gelber | G07F 17/3244 463/20 |
| 2006/0247021 | A1 | 11/2006 | Bulthuis | |
| 2010/0105462 | A1* | 4/2010 | Walker | G07C 15/006 463/17 |
| 2010/0279764 | A1* | 11/2010 | Allen | G07F 17/32 463/25 |
| 2011/0078592 | A1 | 3/2011 | Dawson | |

(Continued)

Primary Examiner — Robert T Clarke, Jr.
(74) Attorney, Agent, or Firm — Esplin & Associates, PC

(57) ABSTRACT

The disclosure relates to facilitating collaboration between multiple players in an online game to achieve a goal in the game. Achievement of the goal may result in provision of an award related to the goal to one or more of the multiple players and/or to one or more affiliations associated with the multiple player. The goal may comprise a predetermined set of tasks required to be completed by more than one player, or may just comprise a predetermined set of tasks that may be completed by one or more players. Responsive to achieving the goal, the award may be provided to one or more recipients. The recipients may comprise, for example, players that initiated the completion of the goal, one or more players who provided the most input to the goal, one or more affiliations associated with respective one or more players involved in achieving the goal, and/or other entities.

20 Claims, 4 Drawing Sheets

(56) References Cited

U.S. PATENT DOCUMENTS

| | | | |
|---|---|---|---|
| 2011/0092271 A1* | 4/2011 | Nguyen | G07F 17/3244 463/25 |
| 2012/0015736 A1 | 1/2012 | Vanbragt | |
| 2012/0015740 A1 | 1/2012 | Vanbragt | |
| 2012/0015748 A1 | 1/2012 | Osada | |
| 2012/0157211 A1 | 6/2012 | Kane | |
| 2012/0157212 A1* | 6/2012 | Kane | A63F 13/10 463/42 |

* cited by examiner

SYSTEM AND METHOD FOR FACILITATING COLLABORATION BETWEEN MULTIPLE PLAYERS TO ACHIEVE A GOAL IN A GAME

FIELD

The disclosure relates to an online game that facilitates collaboration between multiple players to achieve a goal in the online game.

BACKGROUND

Various techniques for facilitating collaboration between players in a game exist. Conventional gaming systems may reward prizes to a player based on social requirements related to a social graph of the player from a separate social networking system. Other conventional systems may facilitate the creation of a crew to participate in a mission based on a social graph of a player from a separate social networking system. Yet other conventional systems may facilitate a virtual collaboration between players that represent a corresponding real-world collaboration.

Conventional systems, however, suffer from various drawbacks and inefficiencies relating to facilitating a collaboration between multiple players in an online game to achieve a goal in the online game. For example, conventional systems may fail to provide a goal in the game that requires input and/or resources from multiple players, where the multiple players are not obtained from a social graph of one of the multiple players.

SUMMARY

One aspect of the disclosure relates to the facilitating collaboration between multiple players in an online game to achieve a goal in the online game. Achievement of the goal may result in provision of an award related to the goal to one or more of the multiple players and/or to one or more affiliations associated with the multiple player. The goal may comprise a predetermined set of tasks required to be completed by more than one player, or may just comprise a predetermined set of tasks that may be completed by one or more players. The players involved in achieving the goal may have an association via a social platform, may know each other through the game, may have no relationship at all, and/or may otherwise be related. Responsive to achieving the goal, the award may be provided to one or more recipients. The recipients may comprise, for example, players that initiated the completion of the goal, one or more players who provided the most input to the goal, one or more affiliations associated with respective one or more players involved in achieving the goal, and/or other entities. The award may be split into portions that may be awarded to multiple recipients. Providing awards and goals that require involvement from more than one player of the game may facilitate collaboration in the game and may enable the provision of larger awards than may be provided to single players.

A system configured to facilitate collaboration between multiple players in an online game may include one or more processors configured to execute compute program modules. The program modules may comprise a game module, an award management module, and/or other modules.

The game module may be configured to execute an instance of a virtual space. The game module may be configured to implement the instance of the virtual space to facilitate participation by one or more users in the online game within the virtual space through one or more client computing platforms associated with the one or more players. The game may include a series of tasks that are performable by the one or more users within the virtual space.

The award management module may be configured to maintain a plurality of awards, such that an individual award may be received in the online game responsive to completing one or more tasks associated with the individual award. The plurality of awards may comprise one or more multiplayer awards. A multiplayer award may be associated with a predetermined set of tasks to be completed by a plurality of players. The plurality of players may include at least a first player and a second player. In some implementations, the first player may be associated with the plurality of players separate from an association with a social platform. The award management module may be configured to award the first multiplayer award to one or more of the plurality of players responsive to completion of the predetermined set of tasks associated with the multiplayer award.

In some implementations, a computer-implemented method of facilitating collaboration between multiple players in an online game may be implemented in a computer system comprising one or more physical processors. The method may comprise executing an instance of a virtual space; implementing the instance of the virtual space to facilitate participation by one or more players in the online game within the virtual space through one or more client computing platforms associated with the one or more players; maintaining a plurality of awards, the plurality of awards comprising a first multiplayer award, the first multiplayer award being associated with a predetermined set of tasks to be completed by a plurality of players, the plurality of players comprising a first player and a second player, the first player being associated with the plurality of players separate from an association with a social platform; and awarding the first multiplayer award responsive to completion of the predetermined set of tasks.

In some implementations a non-transitory electronic storage media may store information related to facilitating collaboration between multiple players in an online game. The stored information may comprise a memory configured to store information related to one or more users of an online game, information related to a plurality of potential awards, and instructions configured to cause a client computing platform to: execute an instance of a virtual space; implement the instance of the virtual space to facilitate participation by one or more players in the online game within the virtual space through one or more client computing platforms associated with the one or more players; maintain the plurality of awards, the plurality of awards comprising a first multiplayer award, the first multiplayer award being associated with a predetermined set of tasks to be completed by a plurality of players, the plurality of players comprising a first player and a second player, the first player being associated with the plurality of players separate from an association with a social platform; and award the first multiplayer award responsive to completion of the predetermined set of tasks.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
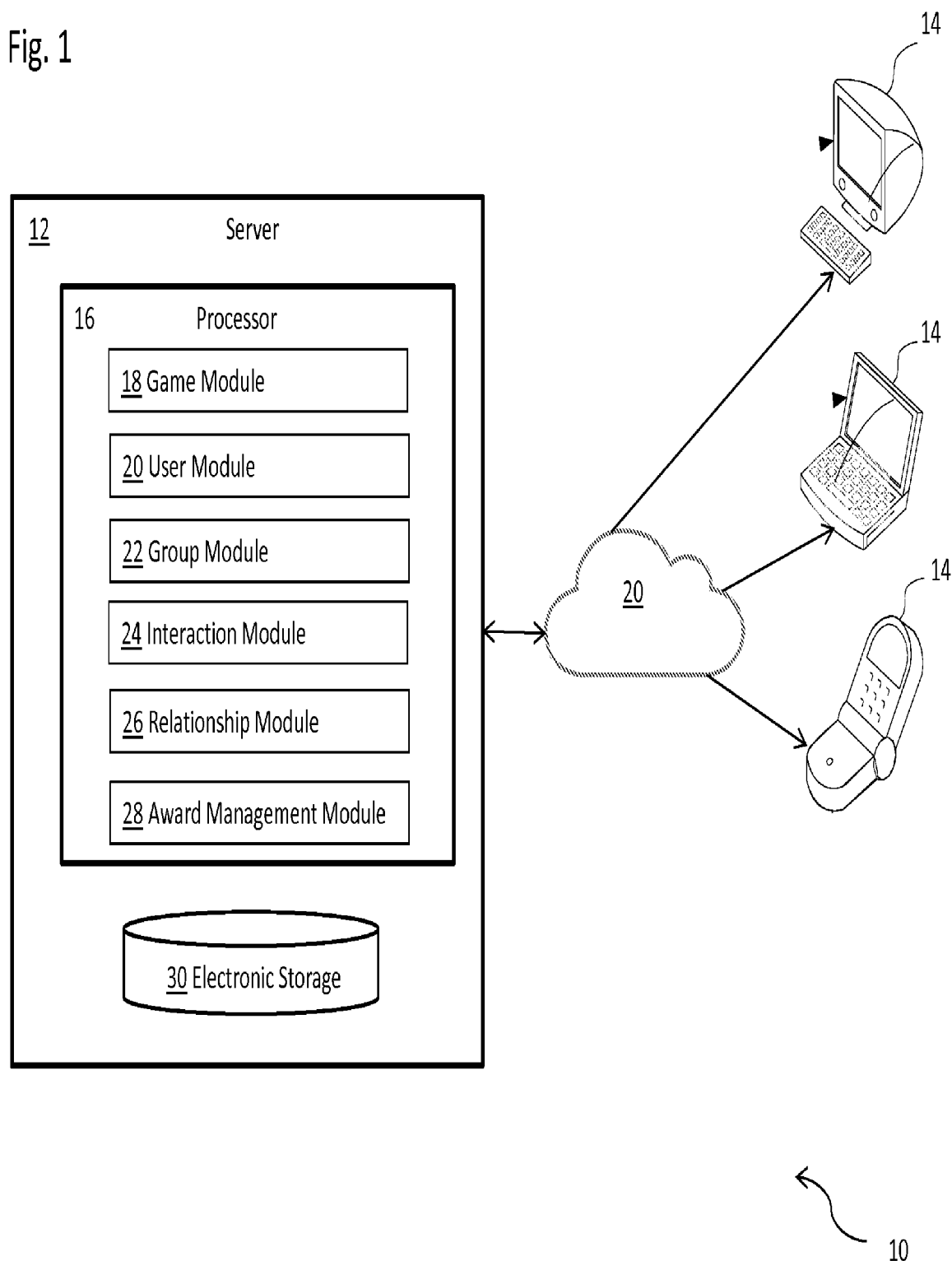
FIG. 1 illustrates an exemplary system configured to facilitate collaboration between multiple players to achieve a goal in the online game, according to various aspects of the invention.

FIG. 1 illustrates a system 10 configured to provide a virtual space to users. Providing the virtual space may include hosting the virtual space over a network. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program modules. The computer program modules may include one or more of a game module 18, a user module 20, a group module 22, an interaction module 24, a relationship module 26, and award management module 28, and/or other modules.

The game module 18 may be configured to execute an instance of a game space. In some implementations, the game space may be a virtual space. As such, a game space may be an instance of the virtual space. A space module may be configured to implement the instance of the virtual space executed by the computer modules to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by and/or associated with a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The instance of the virtual space and/or the game that takes place therein may be persistent. That is, the virtual space and/or the game may continue on whether or not individual players are currently logged in and/or participating in the game. A player that logs out of the virtual space and then logs back in some time later may find the virtual space has been changed through the interactions of other players with the virtual space during the time the player was logged out. These changes may include changes to the simulated physical space, changes in the player's inventory, changes in other player's inventories, changes experienced by non-player characters, and/or other changes.

The above description of the manner in which state of the virtual space is determined by space module is not intended to be limiting. The space module may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through game module 18).

The user module 20 may be configured to access and/or manage one or more user accounts and/or user information associated with users of the system 10. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information related to an inventory of virtual units, virtual structures, virtual currency, virtual items, and/or other virtual assets of users, virtual space usage information, demographic information associated with users, interaction history among users in the virtual space, information stated by users, purchase information of users, browsing history of users, a client computing platform identification associated with a user, a phone number associated with a user, and/or other information related to users.

The user accounts may include at least a first user account for a first user. The first user account may comprise, for example, information related to an inventory of one or more virtual units under the control of and/or associated with the first user, one or more virtual structures under the control of and/or associated with the first user, and/or other virtual assets of the first user.

The group module 22 may be configured to establish and/or manage affiliations within individual virtual spaces. A given affiliation within a given virtual space may include a discrete group of players. For example, a first affiliation within a first virtual space may include a first player, a second player, and/or a discrete set of other players. Examples of an affiliation may include an alliance, a guild, a faction, a club, an association, a group, a crew, a band, a clan, a family, fellowship, a gang, a league, a partnership, a syndicate, a society, a tribe, a troop, a company, and/or other affiliations that include a discrete group of individuals.

The group module 22 may establish affiliations based on affiliation requests and acceptances received from players. Establishment of an affiliation may be initiated by a single communication (e.g., a request) initiated by a given player requesting an affiliation between the given player and one or more other players. Establishment of an affiliation may require a first communication from the given player to be approved by the one or more other players. According to some implementations, the group module 20 may establish affiliations intrinsically within the virtual space (e.g., faction-mates are formed based on avatar configuration), through recognized player behavior over time (e.g., raid members or player-versus-player partners), and/or other approaches for establishing affiliations.

Players belonging to an affiliation may have relationships with some or no functional significance, purpose, and/or impact within a given virtual space. Such relationships within the affiliation may include a leadership structure, a role structure, and/or other relationships within the affiliation. The functional significance of a relationship between players may vary across different virtual spaces. For example, a relationship between the first player and the second player in the first affiliation within the first virtual space may have a different functional significance than a relationship between the first player and the second player in a second affiliation in a second virtual space. By way of non-limiting example of the functional significance of an affiliation within an exemplary virtual space, affiliates within a virtual space may have certain capabilities among each other that are not available to non-affiliates such as sharing and/or trading goods, services, player characters, and/or items in the virtual space; and/or other capabilities among players belonging to an affiliation.

The group module 22 may be configured to store information related to one or more affiliations. For example, for a first affiliation, the group module 22 may store information related to the discrete group of players of the first affiliation and information related to a set of statuses associated with the first affiliation. An individual player in the affiliation may be associated with one or more statuses in the affiliation. An individual status may represent a ranking, a position in a hierarchy, a group of available functions, a group of available abilities, and/or other characteristics related to a role in an affiliation.

The interaction module 24 may be configured to monitor interactions of the users with the virtual space and/or each other within the virtual space. This may include monitoring, for a given user, one or more of times at which the given user is logged in to the virtual space, areas of the virtual space the given user views or interacts with or in, other users the given user interacts with, the nature and/or content of interactions of the given user with other users, activities participated in within the virtual space, level, powers, or skill attained in the virtual space, inventory items obtained in the virtual space, and/or other interactions of the given user with the virtual space and/or other users. Some or all of the information generated by interaction module 24 in monitoring the interactions of the users may be stored to the user profiles managed by user module 20.

At a given time, interaction module 24 may determine a set of users that are currently engaged with the virtual space and/or a set of users that are currently not engaged with the virtual space. Being engaged with the virtual space may refer to being logged in to the virtual space, performing some action or interaction within the virtual space within some period of time (e.g., the last 2 minutes), and/or other taking some other action indicating ongoing and contemporaneous engagement with the virtual space.

The interaction module 24 may be configured to determine, for individual users, an activity metric that indicates an activity level within the virtual space. The activity metric may be determined based on one or more of log in frequency, amount of time logged in to the virtual space within a rolling time period (e.g., over the last day, week, month, or other rolling time period), average amount of time logged in to the virtual space over some length of time (e.g., per day, per week, and/or other length of time), average log in session time over a rolling time period, number of inter-user communications over a length of time, number of inter-user communications per log in, number of relationships with other users in the virtual space, number of new relationships with other users in the virtual space within a rolling time period, amount of real world money spent in the virtual space, and/or other activity parameters.

The relationship module 26 may be configured to establish relationships between users within the virtual space. Such relationships may include one or more of friendships, guilds (with guild-mates), alliances, connections, followers, affiliations, and/or other relationships. The relationship module 26 may establish relationships based on relationship requests and acceptances received from users. Establishment of a relationship may be initiated by a single communication (e.g., a request) initiated by a given user requesting a relationship between the given user and one or more other users. Establishment of a relationship may require a first communication from the given user to be approved by the one or more other users. Relationships may include one or more types of relationships that have a functional purpose or impact within the virtual space, and/or one or more types of relationships that a social construct within the virtual space that does not have a functional result.

The award management module 28 may be configured to maintain a plurality of awards. The award management module 28 may be configured to manage provision of the plurality of awards. The plurality of awards may comprise at least a first multiplayer award and a second multiplayer award. In some implementations, the award management module 28 may manage multiple instances of a particular multiplayer award, such that more than one plurality of players may attempt to attain the multiplayer award.

Figure 2:
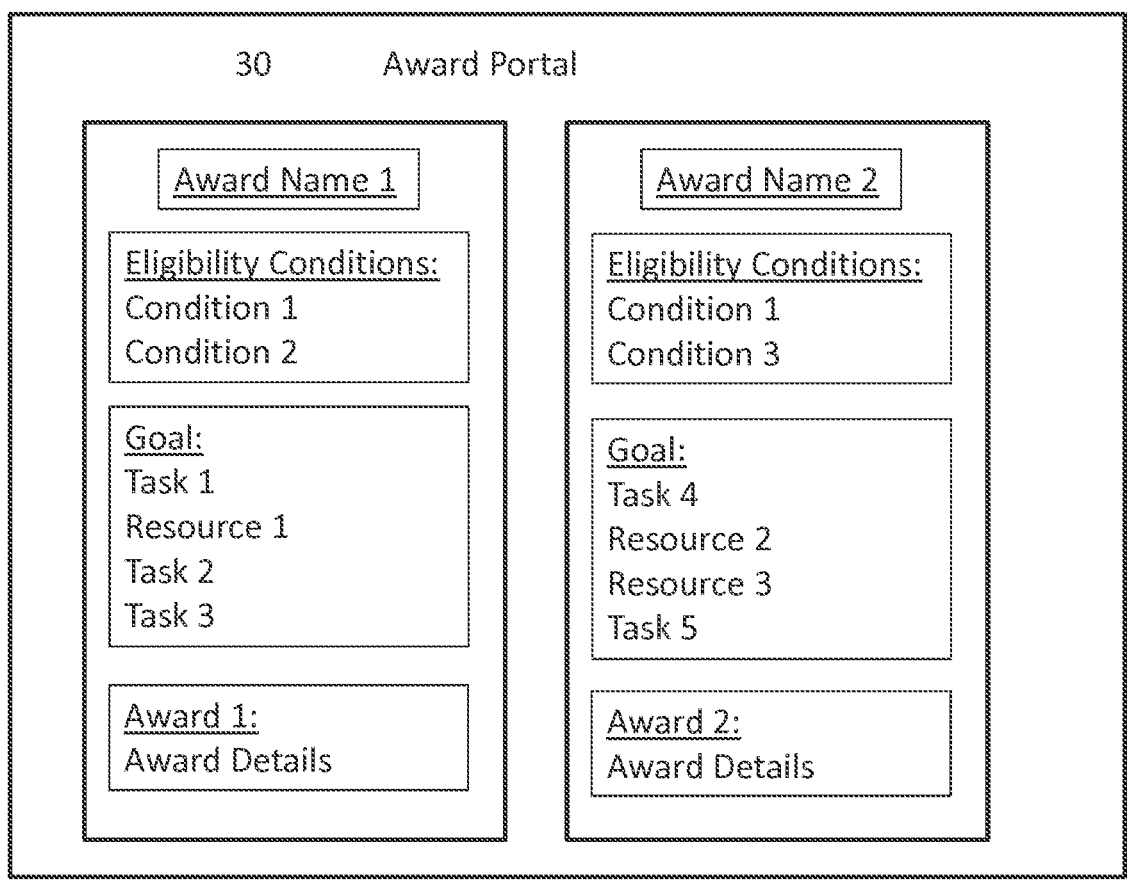
FIG. 2 illustrates an exemplary screenshot of an award management portal, according to various aspects of the invention.

In some implementations, the award management module 28 may maintain an award management portal 30 to manage the plurality of awards. FIG. 2 illustrates an exemplary screenshot of an award management portal 30, according to various aspects of the invention. The award management portal 30 may provide information related to each available multiplayer award of the plurality of multiplayer awards. In some implementations, the award management module 28 may only display the multiplayer awards available to a player via the award management portal 30. The award management module 28 may determine the available multiplayer awards for a player based on, for example, the game state associated with the player, a level of game play of the player, an amount and/or type of resources of the player, a skill in the game of the player, an amount of time the player has played the game, and/or based on other criteria. In some implementations, the award management module 28 may display all multiplayer awards to a player via the award management portal 30. In these implementations, the award management module 28 may display the criteria associated with each respective award.

In some implementations, the electronic storage 30 may store information related to the plurality of awards. For each individual award, the electronic storage may store information related to, for example, whether the award is a multiplayer award. Responsive to the award being a multiplayer award, the electronic storage 30 may store multiplayer award information related to the multiplayer award. The multiplayer award information may comprise, for example, the criteria associated with the availability of the multiplayer award, one or more conditions related to the plurality of players in order to be eligible for the award, a set of tasks to be completed in order to be provided the award, for an individual task, a subset of the plurality of players to be involved in completing the task, information related to the award to be provided, information related to a subset of the plurality of players to which the award is to be provided, information related to how the award is to be provided to individual players of the subset of players, and/or other information related to the multiplayer award.

The award management module 28 may provide for the display of the multiplayer award information related to the plurality of awards via the award management portal 30. For example, as shown in FIG. 2, the eligibility conditions for an award, the set of tasks required, and the information related to the award may be displayed. More or less information related to the multiplayer award may be displayed as well. In some implementations, along with display of information related to a multiplayer award, the award management portal 30 may provide a user selectable component via which a first player may select a multiplayer award. In some implementations, the first player may attempt to attain the multiplayer award in the course of playing the online game without actively selecting a multiplayer award.

Responsive to the first player selecting a multiplayer award, the award management module 28 (e.g., via the award management portal 30), may request information from the first player related to the plurality of players that may be involved in attempting to attain the multiplayer award. The award management module 28 may determine whether the plurality of players are eligible to attempt to attain the multiplayer award, based on the one or more eligibility conditions associated with the award. The eligibility conditions may comprise, for example, association conditions related to associations between the players, game state conditions related to a game state of the online game, resource conditions related to minimum resources of the plurality of players, and/or other eligibility conditions.

Association conditions related to the associations between players may comprise, for example, a required type of affiliation, relationship, social platform, and/or other association between the plurality of players. In some example, the association conditions may require that all of the plurality of the players are part of a same affiliation in the game. In another example, the association conditions may require that at least one player of the plurality of players is not of a same affiliation, relationship, social platform, or other association as the other players of the plurality of players. A social platform may comprise, for example, an online platform via which a player may build relationships, communicate with others, and/or otherwise engage in activity via the online platform. The online game may permit the player to interact in the social platform via the game, may recognize a player's relationships in the social platform, and/or may otherwise connect the social platform with the game.

The game state conditions may require that one or more of the plurality of players have reached a particular part of game play (either alone or in combination), have acquired a predetermined set of skills (either alone or in combination), have achieved a predetermined level of game play (either alone or in combination), and/or have otherwise met a predetermined condition related to the game state of the online game.

The resource conditions may require that plurality of players have a predetermined amount of resources. The resource conditions may take into account the combined resources of each of the plurality of players, may require a predetermined number of the plurality of players to have a predetermined amount and/or type of resources, and/or may have other requirements related to the predetermined amount of resources of the plurality of players.

Responsive to the award management module 28 determining that the first player (and corresponding plurality of players) are eligible to attain the multiplayer award, the award management module 28 may enable the first player to engage the other players of the plurality of players in attaining the multiplayer award.

In some implementations, the first player may be part of an affiliation and/or other relationship in the game. In these implementations, the first player may be authorized by the affiliation and/or other relationship to involve some or all of the players in the affiliation and/or other relationship in attaining the multiplayer award. As such, the plurality of players may be associated with the multiplayer award.

In some implementations, the award management module 28 may facilitate sending, by the first player, a request to the other players of the plurality of players to join the first player in attempting to attain the multiplayer award. The request may include, for example, information related to the multiplayer award (e.g., information relating to eligibility conditions, the set of tasks of the multiplayer award, the award provided, and/or other information), information related to how the award will be shared among the plurality of players, and/or other information related to the multiplayer award.

In these implementations, the award management module 28 may facilitate receiving responses from some or all of the other plurality of players. Responsive to a particular player refusing to participate with the first player, the award management module 28 may enable the first player to send out a request to an alternative player. In another example, the award management module 28 may require the first player to set forth a second proposed plurality of players and determine eligibility of the second proposed plurality of players to attain the multiplayer award. Responsive to each of the other players accepting the first player's request, the award management module 28 may associate the plurality of players with the multiplayer award. In some implementations, a player may receive a bonus, a separate award, and/or other incentive for participating as one of the players in the plurality of players.

Responsive to a plurality of players being associated with the multiplayer award, the award management module 28 may track the activities and resources of each of the plurality of players in the online game to determine whether the plurality of players are completing the set of tasks of the multiplayer award. For example, a set of tasks may comprise one or more actions to be completed by one or more players of the plurality of players, provision of one or more resources for the multiplayer award, and/or other types of tasks. The plurality of resources may comprise, for example, real currency, in-game currency, virtual goods, a combination of resources from more than one player of the plurality of players, and/or other types of resources.

In some implementations, the set of tasks associated with a multiplayer award may also comprise an assembly line task. An assembly line task may require a virtual assembly line to be produced by some or all of the plurality of players. The award management module 28 may facilitate production of an assembly line, for example, to perform a first task of the set of tasks and a second task of the set of tasks to achieve the first multiplayer goal. In some implementations, the award management module 28 may be configured to enable the first player to repeatedly perform the first task. For each individual instance of the first task being performed by the first player in the online game, a corresponding individual first result may be achieved in the online game that corresponds to the performance of the individual instance of the first task. The award management module 28 may be configured to send the corresponding individual first result to a second player of the plurality of players and enable the second player to repeatedly perform a second task using the respective individual first results achieved by the first player.

In some implementations, an individual task of the set of tasks may be associated with conditions for completion. For example, a completion condition may comprise completion of the task after a set of predetermined other actions have been completed, completion by a particular player of the plurality of players, completion by a set of players with a respective set of particular roles in an affiliation, completion by a set of players with a combined predetermined amount of resources, level of skill in the game, at a particular level in game play, and/or with other characteristics related to the game, and/or other completion conditions. The set of players may comprise a particular player, a particular subset of players, and/or other combinations of players of the plurality of players. The award management module 28 may determine whether a task of the set of tasks is completed based on the completion conditions associated with the task. In some implementations, the award management module 28 may access information via the interaction module 24 to determine whether a task has been completed, by which players a task has been completed, and/or other information related to player actions in the online game.

In some implementations, the conditions associated with a task may be determined based on whether the plurality of players have a pre-defined relationship (e.g., associated with an affiliation, an in-game relationship, a social media network, and/or other pre-defined association). For example, the conditions associated with a task (and/or the set of tasks) may be determined based on a permissions or hierarchy structure of the pre-defined relationship. The structure of the pre-defined relationship may define the participation and control afforded to individual players in the plurality of players. In an example in which the plurality of players are associated with an affiliation, a leader in the affiliation may determine which tasks are performed by which players, control which players contribute which resources, determine which resources of the affiliation are used toward the multiplayer award, determine how the award is shared in the affiliation, and/or otherwise control interaction between the plurality of players and the multiplayer award. In some implementations, the award management module 28 may interact with the group module 22, the relationship module 26, and/or other modules to determine the structure of the pre-defined relationship, the type and/or amount of participation to afford to an individual player, and/or for other information related to affiliations, relationships, and/or other associations of a particular player.

In some implementations, the plurality of players may not have a pre-defined relationship with each other. In some examples, the first player who invited other players may exert control over the participation of the individual players of the plurality of players in achieving the multiplayer award. In some examples, no player exerts control over the participation of other players. In some examples, a first player (or another player) may request participation by another player in a task.

In some examples, the award management module 28 may afford control of the participation to one or more players who contributed the most to the attempt to achieve the multiplayer award. For example, after a predetermined amount of activity to achieve the multiplayer award, the award management module 28 may determine a predetermined number of players with the most contribution thus far in the attempt. The contribution may comprise time of game play, amount of resources provided, amount of tasks completed by or participated in by the players, and/or other metrics to determine contribution. The metrics used to determine contribution may be pre-set, may vary by multiplayer award, may be set by the first player who initiated the attempt to achieve the multiplayer award, and/or may otherwise be determined.

The award management module 28 may be configured to enable a player to be invited to participate in a particular task of the set of tasks. In some implementations, the award management module 28 may be configured to enable the player afforded control (e.g., the first player) the ability to invite a second player of the plurality of players to participate in a task of the set of tasks. In some implementations, the award management module 28 may be configured to enable any player of the plurality of players to invite one or more players to participate in a task. Responsive to a player accepting the invitation, the award management module 28 may consider the second player's actions when determining whether the task has been completed. In some implementations, the award management module 28 may only consider actions by particular players invited to participate in a task or players afforded control over participation when determining whether a task is completed for the multiplayer award. In some implementations, the award management module 28 may consider any actions by any of the players in the plurality of players when determining whether a task is completed for the multiplayer award.

In some implementations, the award management module 28 may be configured to enable any player of the plurality of players to initiate a task of the set of tasks. In some implementations, the award management module 28 may be configured to control which players may be allowed to initiate a task based on whether a player was invited to participate in the task.

Figure 3:
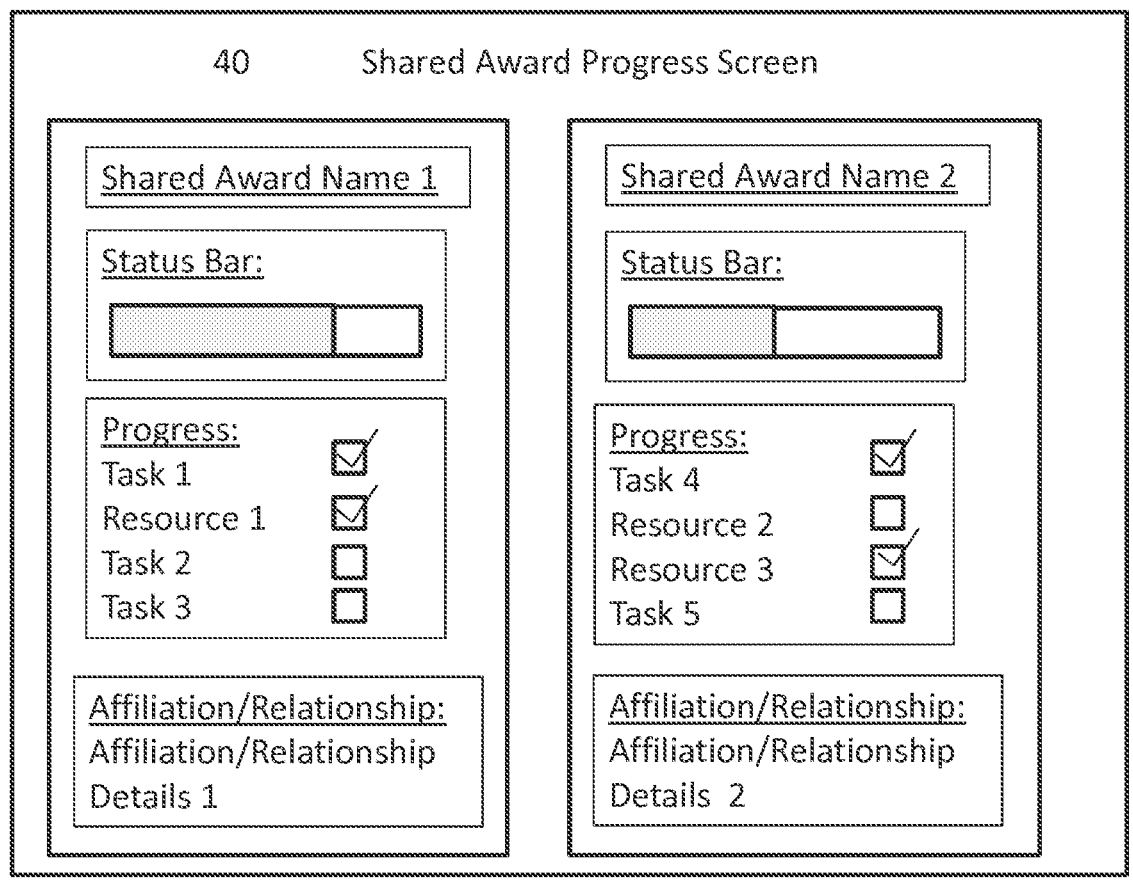
FIG. 3 illustrates an exemplary screenshot of an award progress screen, according to various aspects of the invention.

The award management module 28 may track progress of completion of a multiplayer award. The award management module 28 may also enable a player to view progress of the multiplayer awards with which the player may be associated. FIG. 3 illustrates an exemplary screenshot of an award progress screen, according to various aspects of the invention. The award management module 28 may make available the award progress screen 40 to each player in a plurality of players associated with a multiplayer award. The award progress screen 40 may be reached in the online game by a player from a player's profile, from the award management portal, and/or from other views presented in the game.

For each multiplayer award with which a player is associated, the award progress screen 40 may display, for example, a name of the award, a status bar indicative of how much progress has been made towards the multiplayer award, a description of each task of the set of tasks, an indication corresponding to each task that depicts whether the task has been completed, information related to any affiliations, relationships, and/or other associations the player may have with one or more other players of the plurality of players attempting to attain the multiplayer award, and/or other information related to the multiplayer award.

The award management module 28 may be configured to award the multiplayer award to one or more of the plurality of players responsive to completion of the set of tasks associated with the multiplayer award.

Responsive to a determination that the plurality of players associated with the multiplayer award are part of a same affiliation, relationship, and/or other association, the award management module 28 may be configured to award the multiplayer award for use by the affiliation and/or other association. In some implementations, the award management module 28 may be configured to award a respective first portion and second portion of the multiplayer award to the first player and a second player based on respective roles of the first player and the second player in the first affiliation.

In some implementations, the award management module 28 may be configured to split the multiplayer award between one or more players of the plurality of players based on a number of tasks initiated by a respective player, a number of tasks participated in by a respective player, based on respective individual contributions by a respective player, and/or based on another metric related to participation by the player in attaining the multiplayer award. Other ways of splitting the multiplayer award may also be used. The ways in which the award management module 28 may split the award among the plurality of players are not limited to the examples described herein.

In some implementations, the multiplayer award may comprise an award not otherwise available to a player via game play, from a virtual store associated with the online game, and/or by other interaction with the online game. In some implementations, the multiplayer award may not be split among the plurality of players. In these implementations, the plurality of players may use the multiplayer award during game play. The use of the multiplayer award may be determined, for example, by one or more players with control over participation in attaining the multiplayer award, by a majority vote of the plurality of players, at a time in the game when use of the multiplayer award is necessary for one or more of the players of the plurality of players to move forward in the online game, and/or otherwise based on game play in the online game.

In some implementations, the server 12, client computing platforms 14, and/or other components of the system 10 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or other components of the system 10 may be operatively linked via some other communication media.

A given client computing platform 14 may include one or more processors configured to execute computer program modules. The computer program modules may be configured to enable an expert or user associated with the given client computing platform 14 to interface with system 10 and/or other components of the system 10, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 30, one or more processors 16, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14 and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, 26, 28, and/or other modules. Processor 16 may be configured to execute modules 18, 20, 22, 24, 26, 28, and/or other modules by software; hardware; firmware; some combination of software, hardware, and/or firmware; and/or other mechanisms for configuring processing capabilities on processor 16.

It should be appreciated that although modules 18, 20, 22, 24, 26, 28, and/or other modules are illustrated in FIG. 1 as being co-located within a single processing unit, in implementations in which processor 16 includes multiple processing units, one or more of modules 18, 20, 22, 24, 26, 28, and/or other modules may be located remotely from the other modules. The description of the functionality provided by the different modules 18, 20, 22, 24, 26, 28, and/or other modules described below is for illustrative purposes, and is not intended to be limiting, as any of modules 18, 20, 22, 24, and/or other modules may provide more or less functionality than is described. For example, one or more of modules 18, 20, 22, 24, 26, 28, and/or other modules may be eliminated, and some or all of its functionality may be provided by other ones of modules 18, 20, 22, 24, 26, 28, and/or other modules. As another example, processor 16 may be configured to execute one or more additional modules that may perform some or all of the functionality attributed below to one of modules 18, 20, 22, 24, 26, 28, and/or other modules.

Figure 4:
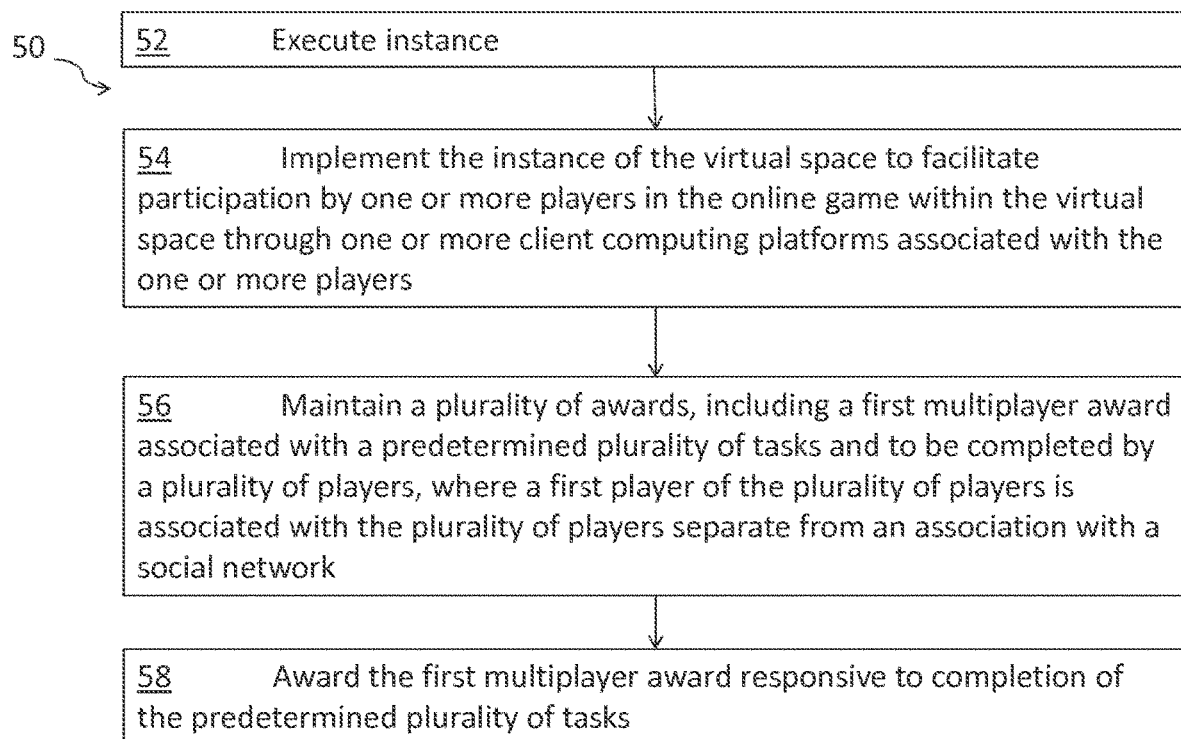
FIG. 4 illustrates an exemplary method of facilitating collaboration between multiple players to achieve a goal in the online game, according to various aspects of the invention.

FIG. 4 illustrates a method 50 of facilitating collaboration between multiple players in an online game, according to various aspects of the invention. The operations of method 50 presented below are intended to be illustrative. In some embodiments, method 50 may be accomplished with one or more additional operations not described, and/or without one or more of the operations discussed. Additionally, the order in which the operations of method 50 are illustrated in FIG. 4 and described below is not intended to be limiting.

In some embodiments, method 50 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 50 in response to instructions stored electronically on an electronic storage medium. The one or more processing devices may include one or more devices configured through hardware, firmware, and/or software to be specifically designed for execution of one or more of the operations of method 50.

At an operation 52, an instance of a virtual space may be executed. In some implementations, operation 52 may be performed by a game module the same as or similar to game module 18 (shown in FIG. 1 and described above).

At an operation 54, the instance of the virtual space may be implemented to facilitate participation by one or more players in the online game within the virtual space. The one or more players may participate through one or more client computing platforms associated with the one or more players. In some implementations, operation 54 may be performed by a game module the same as or similar to game module 18 (shown in FIG. 1 and described above).

At an operation 56, a plurality of awards may be maintained. The plurality of award may comprise, for example, a first multiplayer award. The first multiplayer award may be associated with a predetermined set of tasks to be completed by a plurality of players. A first player of the plurality of players may be associated with the plurality of players separate from an association with a social platform. In some implementations, operation 56 may be performed by an award management module the same as or similar to award management module 28 (shown in FIG. 1 and described herein).

At operation 58, the first multiplayer award may be awarded responsive to completion of the predetermined set of tasks. In some implementations, operation 58 may be performed by an award management module the same as or similar to award management module 28 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate collaboration between players in an online game, the system comprising:
one or more processors configured by machine-readable instructions to:
execute an instance of a virtual space, and facilitate participation by the players in the online game within the virtual space through one or more client computing platforms associated with the players;
store associations of the players in the online game, wherein the players include a first player, a second player, and a third player, and wherein the associations include a first association of the first player, the second player, and the third player that is separate from an association within a social platform;
facilitate participation in collaborative gameplay towards a goal within the online game, wherein achieving the goal requires completing a series of individual tasks, wherein the series of individual tasks includes provision of one or more resources, wherein the resources include virtual goods that are usable within the online game, wherein the goal is associated with a multiplayer award, wherein the series of individual tasks includes a first task individually performable by the first player, a second task individually performable by the second player, and a third task individually performable by the third player, wherein the second task requires a first result generated by completion of the first task, and wherein the third task requires a second result generated by completion of the second task;

determine metrics that quantify contributions by individual players towards completion of the goal such that a first metric is determined for the first player based on quantifying a first contribution by the first player towards completion of the goal, a second metric is determined for the second player based on quantifying a second contribution by the second player towards completion of the goal, and a third metric is determined for the third player based on quantifying a third contribution by the third player towards completion of the goal;

determine awards such that responsive to completion of the series of individual tasks, the multiplayer award is determined for the first player, the second player, and the third player based on the determined metrics that quantify contributions towards completion of the goal, wherein the multiplayer award includes a first award that is determined based on the first metric for the first player, a second award that is determined based on the second metric for the second player, and a third award that is determined based on the third metric for the third player; and provide the multiplayer award to the first player, the second player, and the third player such that the first award is provided to the first player, the second award is provided to the second player, and the third award is provided to the third player.

2. The system of claim 1, wherein the first player, the second player, and the third player are associated with a first affiliation of players, and wherein the one or more processors are further configured by machine-readable instructions to provide the multiplayer award for use by the first affiliation.

3. The system of claim 1, wherein achieving the goal requires completing the series of individual tasks successively such that completing the series of individual tasks is sufficient to achieve the goal.

4. The system of claim 1, wherein a first number of tasks in addition to the first task are initiated by the first player and a second number of tasks in addition to the second task are initiated by the second player, and wherein the one or more processors are further configured by machine-readable instructions to provide the multiplayer award based on the first number of tasks initiated by the first player and the second number of tasks initiated by the second player.

5. The system of claim 4, wherein the one or more processors are further configured by machine-readable instructions to enable the first player to invite the second player to join in at least one of the first number of tasks initiated by the first player.

6. The system of claim 1, wherein the one or more processors are further configured by machine-readable instructions to:

display a status bar indicative of how much progress has been made towards the achievement of the goal.

7. The system of claim 1, wherein the multiplayer award is predetermined for the goal.

8. The system of claim 1, wherein, responsive to achieving the goal, the one or more processors are further configured by machine-readable instructions to provide a first portion of the multiplayer award to the first player and a second portion of the multiplayer award to the second player based on relative performance of the first player and the second player towards achieving the goal, such that responsive to the first player providing more input towards achieving the goal than the second player, the first portion of the multiplayer award is larger than the second portion, wherein relative performance of the first player and the second player is assessed based on one or both of numbers of tasks initiated by the first player and the second player, and/or numbers of tasks participated in by the first player and the second player.

9. The system of claim 1, wherein the one or more processors are further configured by machine-readable instructions to:

combine a plurality of resources associated with the first player, the second player, and the third player for use in performing the series of individual tasks.

10. The system of claim 9, wherein the plurality of resources comprises one or more of real currency, in-game currency, and/or virtual goods.

11. A computer-implemented method of facilitating collaboration between players in an online game, the method comprising:

executing an instance of a virtual space;

facilitating participation by the players in the online game within the virtual space through client computing platforms associated with the players;

storing associations of the players in the online game, wherein the players include a first player, a second player, and a third player, and wherein the associations include a first association of the first player, the second player, and the third player that is separate from an association within a social platform;

facilitating participation in collaborative gameplay towards a goal within the online game, wherein achieving the goal requires completing a series of individual tasks, wherein the series of individual tasks includes provision of one or more resources, wherein the resources include virtual goods that are usable within the online game, wherein the goal is associated with a multiplayer award, wherein the series of individual tasks includes a first task individually performable by the first player, a second task individually performable by the second player, and a third task individually performable by the third player, wherein the second task requires a first result generated by completion of the first task, and the third task requires a second result generated by completion of the second task;

determining metrics that quantify contributions towards completion of the goal such that a first metric is determined for the first player based on quantifying a first contribution by the first player towards completion of the goal, a second metric is determined for the second player based on quantifying a second contribution by the second player towards completion of the goal, and a third metric is determined for the third player based on quantifying a third contribution by the third player towards completion of the goal;

determining awards such that responsive to completion of the series of individual tasks, the multiplayer award is determined for the first player, the second player, and the third player based on the determined metrics that quantify contributions by individual players towards completion of the goal, wherein the multiplayer award includes a first award that is determined based on the first metric for the first player, a second award that is determined based on the second metric for the second player, and a third award that is determined based on the third metric for the third player; and providing the multiplayer award to the first player, the second player, and the third player such that the first award is provided to the first player, the second award is provided to the second player, and the third award is provided to the third player.

12. The method of claim 11, wherein the first player, second player, and the third player are associated with a first affiliation, the method further comprising:

providing the multiplayer award for use by the first affiliation.

13. The method of claim 11, wherein achieving the goal requires completing the series of individual tasks successively such that completing the series of individual tasks is sufficient to achieve the goal.

14. The method of claim 11, wherein a first number of tasks in addition to the first task are initiated by the first player and a second number of tasks in addition to the second task are initiated by the second player, the method further comprising:

providing the multiplayer award based on the first number of tasks initiated by the first player and the second number of tasks initiated by the second player.

15. The method of claim 14, further comprising:

enabling the first player to invite the second player to join in at least one of the first number of tasks initiated by the first player.

16. The method of claim 11, further comprising:

displaying a status bar indicative of how much progress has been made towards the achievement of the goal.

17. The method of claim 11, wherein the multiplayer award is predetermined for the goal.

18. The method of claim 11, further comprising:

providing, responsive to achieving the goal, a first portion of the multiplayer award to the first player and a second portion of the multiplayer award to the second player based on relative performance of the first player and the second player towards achieving the goal, such that responsive to the first player providing more input towards achieving the goal than the second player, the first portion of the multiplayer award is larger than the second portion.

19. The method of claim 11, further comprising:

combining a plurality of resources associated with the first player, the second player, and the third player for use in performing the series of individual tasks.

20. The method of claim 19, wherein the plurality of resources comprises one or more of real currency, in-game currency, and/or virtual goods.

* * * * *